(12) United States Patent
Niwamae et al.

(10) Patent No.: US 7,639,301 B2
(45) Date of Patent: Dec. 29, 2009

(54) IMAGING APPARATUS INCLUDING DEVICE FOR REMOVING FOREIGN MATTER ADHERING ON SURFACE OF OPTICAL MEMBER

(75) Inventors: Yuuki Niwamae, Ohta-ku (JP); Shoji Kaihara, Yokohama (JP); Hiroshi Yoshii, Yokohama (JP); Eiri Tsukatani, Shinagawa-ku (JP); Hirokazu Ichiki, Hachioji (JP); Futoshi Hirai, Kawasaki (JP); Toshifumi Urakami, Kawasaki (JP); Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/555,006

(22) Filed: Oct. 31, 2006

(65) Prior Publication Data

US 2007/0103579 A1 May 10, 2007

(30) Foreign Application Priority Data

Nov. 7, 2005 (JP) .............................. 2005-322376

(51) Int. Cl.
*H04N 5/225* (2006.01)
*H04N 5/228* (2006.01)
*G02B 13/16* (2006.01)

(52) U.S. Cl. .................................. 348/335; 348/208.11

(58) Field of Classification Search .............. 348/208.4, 348/208.5, 208.7, 208.11, 208.12; 396/52, 396/53
See application file for complete search history.

(56) References Cited

U.S. PATENT DOCUMENTS

| 7,006,138 B2 | 2/2006 | Kawai |
| 2003/0214599 A1 | 11/2003 | Ito et al. |
| 2005/0088563 A1* | 4/2005 | Ito et al. ..................... 348/335 |
| 2005/0206735 A1* | 9/2005 | Seo .......................... 348/208.4 |
| 2005/0280712 A1 | 12/2005 | Kawai |
| 2006/0033818 A1* | 2/2006 | Wada et al. ............. 348/208.11 |

FOREIGN PATENT DOCUMENTS

JP 2002-204379 A 7/2002

* cited by examiner

*Primary Examiner*—Sinh Tran
*Assistant Examiner*—Jason Flohre
(74) *Attorney, Agent, or Firm*—Canon U.S.A., Inc. I.P. Division

(57) ABSTRACT

An imaging apparatus capable of easily removing a foreign matter adhering on an optical filter surface is disclosed. A rubber member holding an optical low pass filter seals an imaging sensor and the optical low pass filter, and a piezoelectric element vibrates an edge portion of the optical low pass filter in the direction of an optical axis, and gives the optical low pass filter a rotational force around an axis orthogonal to an imaging optical axis.

6 Claims, 9 Drawing Sheets

IMAGING APPARATUS INCLUDING DEVICE FOR REMOVING FOREIGN MATTER ADHERING ON SURFACE OF OPTICAL MEMBER

BACKGROUND OF THE INVENTION

1. Field of the Invention

The present invention relates to an imaging apparatus including a device for removing foreign matter adhered on a surface of an optical member.

2. Description of the Related Art

In a digital single lens reflex camera, dust and trash often infiltrate from the outside when an imaging lens is exchanged, or foreign matter such as abrasion dust generated inside the camera by operation of a quick return mirror and a focal plane shutter, travel within the camera body and adhere on the protection cover glass of an imaging sensor, the surface of an infrared cut filter and an optical low pass filter disposed in the vicinity of the imaging sensor. When imaging is performed in a state where such foreign matter is adhering, a shade of the foreign matter together with a subject is imaged by the imaging sensor, thereby adversely affecting the image.

In order to avoid such a problem, an adherence of foreign matter can be hindered by providing a dust proof member, and the foreign matter adhering on the surface of the dustproof member can be removed by vibrating the dustproof member as discussed by, for example, Japanese Patent Application Laid-Open No. 2002-204379. According to this method, the foreign matter can be removed without damaging the surface of the dustproof member, and the shade of the foreign matter can be prevented from being imaged into the captured image.

However, according to the dustproof member discussed in Japanese Patent Application Laid-Open No. 2002-204379, in order to remove the foreign matter, it is necessary to apply a force, which exceeds the adhering force of the foreign matter on the dustproof member, to the foreign matter in the direction of an optical axis, and a large energy is required.

In order to solve such a problem, vibration can be generated in a direction orthogonal to the adhering force acting on an optical filter of the foreign matter, that is, in a direction orthogonal to an optical axis. The foreign matter is moved by an amount of the adhering force of the foreign matter to the optical filter multiplied by the coefficient of static friction. Further, the optical filter is vibrated in the direction of the optical axis in a state where the adhering force is reduced. Thus, the foreign matter is removed from the optical filter and the foreign matter is dropped in a direction of the gravitational force. That is, with the vibration in a direction orthogonal to the optical axis of the optical filter, the foreign matter can be removed by a smaller force as compared with the vibration made only in the direction to the optical axis. That is, the vibration of the optical filter in the direction to the optical axis is targeted at the foreign matter which adheres with reduced force, and therefore, it is possible to fly away the foreign matter only by a slight force. Consequently, energy consumption for removing the foreign matter becomes smaller in the above described configuration.

In order to implement such configuration, a device for vibrating the optical filter can be disposed on both planes horizontal and orthogonal to the optical axis of the optical filter. However, to install two or more vibrating devices requires more space, and this presents a problem in that a size of the digital single lens reflex camera increases.

Further, as other method of implementing the above described configuration, the device for vibrating the optical filter can be disposed diagonally to the optical axis with respect to the optical filter, and the optical filter can be vibrated in a synthesized direction of the direction orthogonal to the optical axis and the optical axis direction. FIG. 9 is a sectional view of such configuration, in which an optical filter 302 with foreign matter 301 adhering thereon, is bonded with a piezoelectric element 303 (i.e., the vibrating device) in a direction diagonal to the optical axis. However, there is a problem in that, when acceleration required for removing the foreign matter is applied to the optical filter, a large bending moment is generated to the vibrating device such as the piezoelectric element, a super magnetostrictive element as shown in an arrow of FIG. 9, and there is a concern that the vibrating device can break down.

SUMMARY OF THE INVENTION

The prevent invention is directed to an imaging apparatus capable of easily removing the foreign matter adhering on the surface of an optical filter.

According to an aspect of the present invention, an imaging apparatus is provided which includes an imaging sensor configured to convert an optical image of a subject into an electrical signal; an optical member disposed in front of the imaging sensor in axial alignment with an imaging optical axis of the imaging apparatus; a vibrating device having a vibration surface adapted to vibrate in an oscillating direction; a control device configured to control the vibration of the vibrating device; and a flexible holding member configured to hold the optical member in a housing. The oscillating direction is orthogonal to the imaging optical axis, and the vibration surface is in contact with a perimeter edge portion of the optical member and generally positioned in parallel with the optical axis so that the optical member receives a rotational force around an axis orthogonal to the imaging optical axis.

According to another aspect of the present invention, the control device performs control so that the vibrating device generates at least one of a sine wave oscillation, a trapezoid wave oscillation, and a sawtooth wave oscillation. And still further, according to another aspect of the present invention, the holding member seals the imaging sensor and the optical member.

According to another aspect of the present invention, an imaging apparatus is provided which includes an imaging sensor configured to convert an optical image of a subject into an electrical signal; an optical member disposed in front of the imaging sensor in axial alignment with an imaging optical axis of the imaging apparatus; a vibrating device having a vibration surface configured to vibrate in an oscillating direction; a control device configured to control the vibration of the vibrating device; a flexible holding member configured to hold the optical member in a housing; and a rigid holding member configured to hold the optical member in a housing, that has rigidity higher than the vibrating device. The oscillating direction is orthogonal to the imaging optical axis, and the vibration surface is in contact with a perimeter edge portion of the second holding member in the direction of the optical axis so that the optical member receives a rotational force around an axis orthogonal to the imaging optical axis.

Furthermore, according to yet another aspect of the present invention, the control device performs control such that the vibrating device generates at least one of a sine wave oscillation, a trapezoid wave oscillation, and a sawtooth wave oscillation. And moreover, according to another aspect of the present invention, the flexible holding member seals the imaging sensor and the optical member.

Further embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features and aspects of the present invention and, together with the description, serve to explain the principles of the invention.

DETAILED DESCRIPTION OF THE EMBODIMENTS

Exemplary embodiments, features and various aspects of the present invention will now herein be described in detail below with reference to the drawings.

First Exemplary Embodiment

Figure 1:
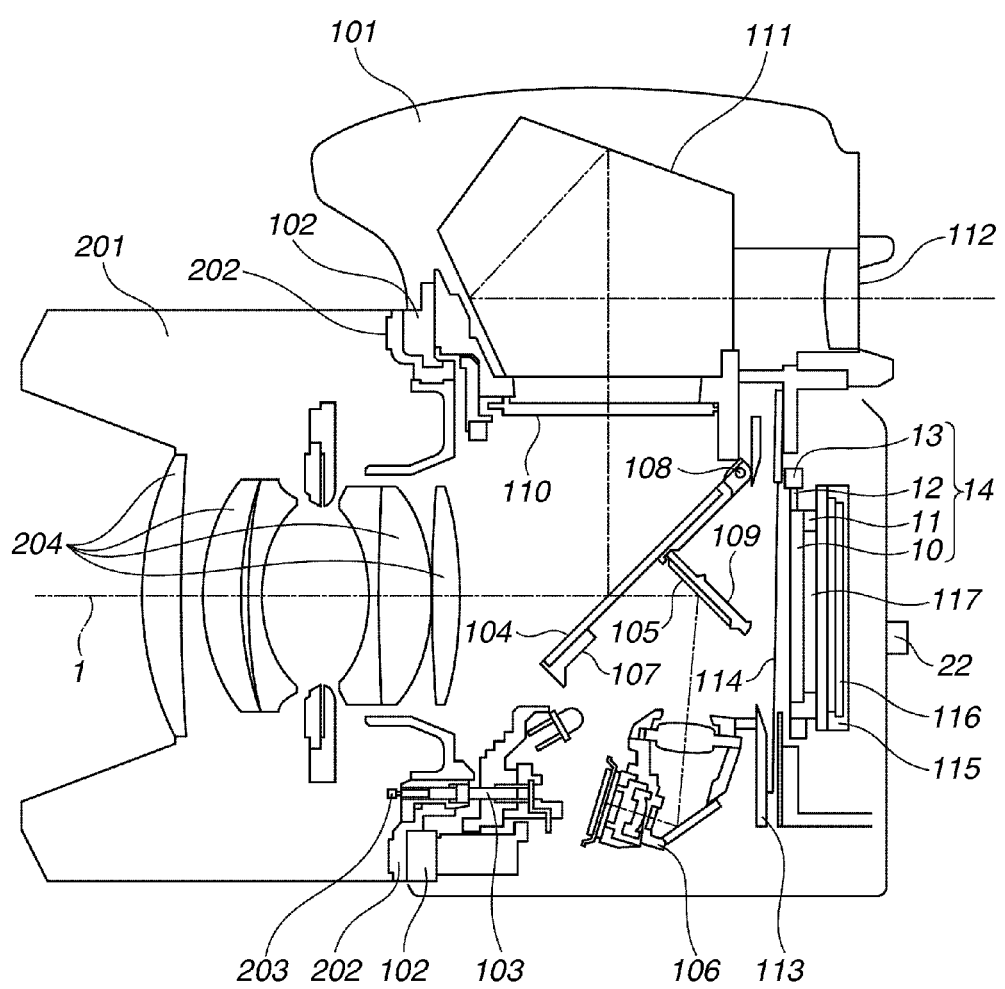
FIG. 1 is a central sectional view of an exemplary digital single lens reflex camera according to an aspect of the present invention.

FIG. 1 is a central sectional view of a digital single lens reflex camera body 101 and an interchangeable lens 201 according to a first embodiment.

The interchangeable lens 201, which is detachable from the camera body 101, is fixed by a mount portion 102 of the camera body 101 and a mount portion 202 of the interchangeable lens 201. When the interchangeable lens 201 is mounted, a contact portion 103 of the camera body 101 and a contact portion 203 of the interchangeable lens 201 are brought into contact. By this contact, an electrical connection is made, and the camera 101 detects that the interchangeable lens 201 is mounted. Further, power is supplied from the camera body 101 to the interchangeable lens 201 and communications for controlling the interchangeable lens 201 are performed through the contact portions 103 and 203.

The light flux having passed through an imaging lens 204 of the interchangeable lens 201 enters a main mirror 104 of the camera body 101. The main mirror 104 is a half mirror, and the light flux reflected by this main mirror 104 is guided to a finder. The light flux having passed through the main mirror 104 is reflected downward by a sub-mirror 105, and is guided to a focus detection unit 106. The focus detection unit 106 detects a defocus amount of the imaging lens 204, and calculates a lens driving amount in moving the imaging lens 204 so that the imaging lens 204 is put into a focused state. When the calculated lens driving amount is sent to the interchangeable lens 201 through the contact portions 103 and 203, the interchangeable lens 201 controls a motor (not shown), and performs focus adjustment by moving a focus lens which is a part of the imaging lens 204.

The main mirror 104 is fixed to a main mirror holding frame 107, and is rotatably supported by a hinge axis 108. The sub-mirror 105 is fixed to a sub-mirror holding frame 109. The sub-mirror holding frame 109 is rotatably supported with respect to the main mirror holding frame 107 by a hinge axis (not shown). The light flux guided to the finder by the main mirror 104 forms a subject image on a focus plate 110. A user observes the subject image on the focus plate 110 through a pentaprism 111 and an eyepiece lens 112.

Behind the sub-mirror 105, a shutter 113 is arranged, and shutter blades 114 thereof is usually in a closed state. Behind the shutter 113, an optical lowpass filter 10 is disposed. Behind the optical low pass filter 10, an imaging sensor 116 and a cover member 117 are disposed. The imaging sensor 116 is held by an imaging sensor holder 115 which is fixed to the housing by fasteners (not shown). The cover member 117 protects the imaging sensor 116. A resilient member 11, (for example, a rubber member) holds the optical low pass filter 10 and seals a space between the optical low pass filter 10 and the imaging sensor 116. The member 11 dampens the vibration propagated around without obstructing the oscillation of the optical low pass filter 10, and prevents infiltrating of the foreign matter into the imaging sensor 116.

When an image is captured, the light flux having passed through this optical low pass filter 10 enters the imaging sensor 116. The resilient member 11 may be made from a variety of materials, including but not limited to, a rubber member, a sponge like material, a gel member, or a double-faced tape having a predetermined thickness or the like. An operation unit 22 sets the camera body 101 in a cleaning mode in order to remove the foreign matter adhering on the optical filter 10.

A vibration surface 12b of the piezoelectric element 12 is bonded to perimeter edge surface (or portion) 10a (see FIGS. 2B and 5A) of the optical low pass filter 10. And thus, in general, the perimeter edge portion 10a of the filter 10 is positioned in a plane parallel with an optical axis 1. Further, an opposing surface 12c (see FIGS. 2C and 5A) which opposes the vibration surface 12b of the piezoelectric element 12 is bonded to an optical low pass filter holder 13 made of a material having relatively large specific gravity such as copper or iron, for example. Further, the resilient member 11 for holding the optical low pass filter 10 is connected to the optical low pass filter holder 13 fixed to the imaging sensor holder 115 by fasteners, such as screws (not shown), constituting an exemplary foreign matter removing unit 14.

Figure 2A:
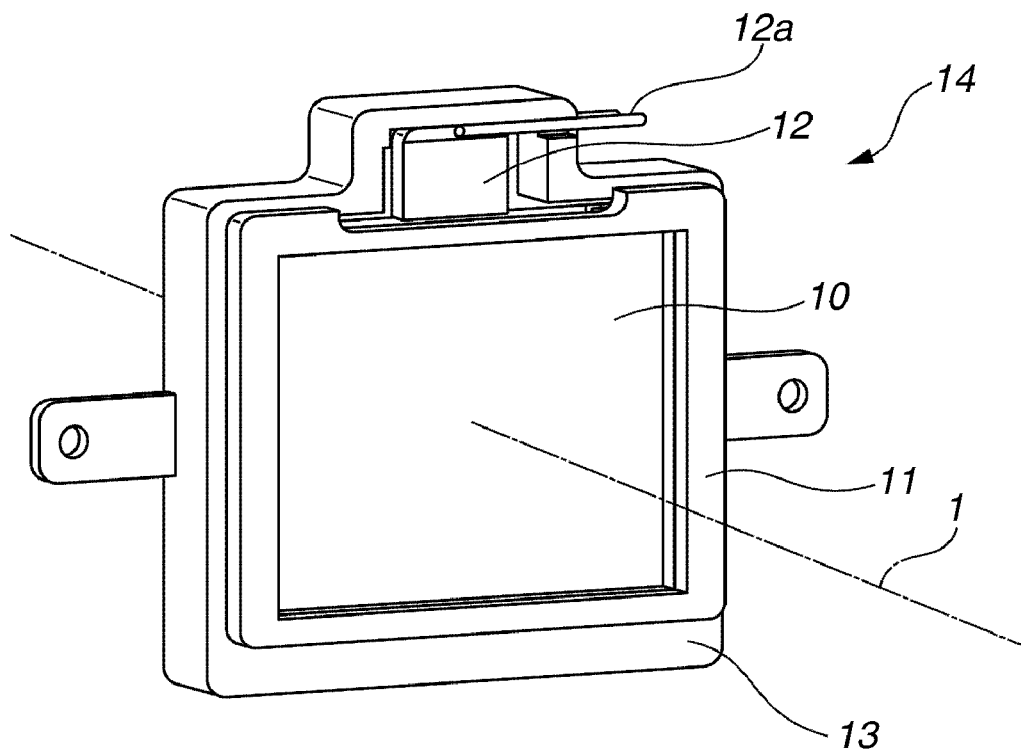
FIGS. 2A and 2B are perspective views of an exemplary foreign matter removing unit according to an aspect of the present invention.
Figure 2B:
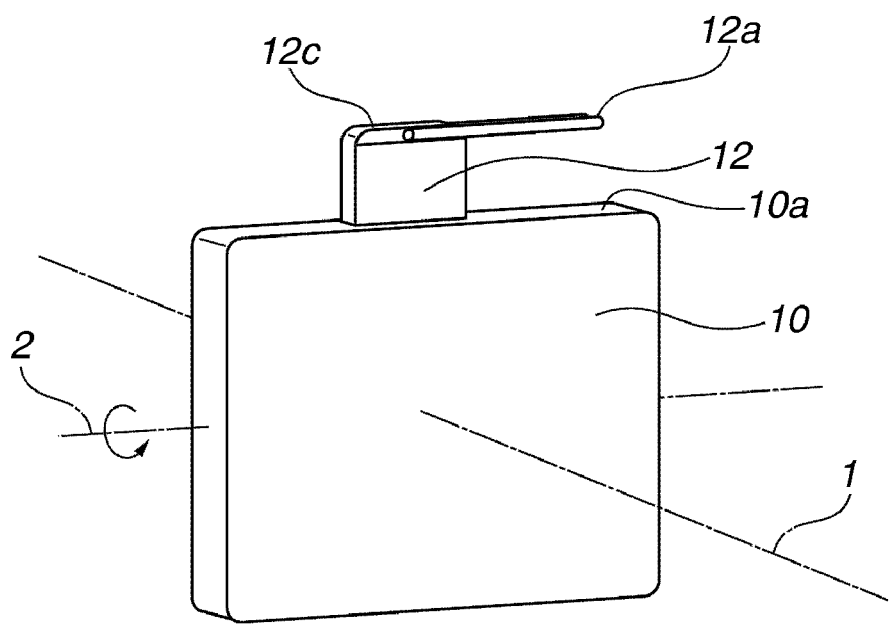

FIG. 2A is a perspective view of an exemplary foreign matter removing unit 14, and FIG. 2B is a perspective view representing a relationship between the optical low pass filter 10 and the piezoelectric element 12 in the foreign matter removing unit 14, in which portions similar to those in FIG. 1 are denoted by the same reference numerals.

In FIG. 2A, the resilient member 11 holds an outer periphery of the optical low pass filter 10 and seals a space between the cover member 117 and the low pass filter 10. A periodic voltage is applied to the piezoelectric element 12 through a lead wire 12a from an optical low pass filter vibration control circuit 20 which will be described later, so that the vibration surface 12b of the piezoelectric element 12 vibrates in a direction orthogonal to the optical axis 1.

As described above, the piezoelectric element 12, as shown in FIG. 2B, is fixed to a perimeter edge surface 10a of the filter 10, which is generally in a plane parallel with the optical axis 1 of the optical low pass filter 10. More specifically, the piezoelectric element 12 is installed such that the vibration force is biased in the direction of the optical axis 1 with respect to a point immediately below the center of gravity of the optical low pass filter 10. That is, a vibration force vector does not pass through the center of gravity of the optical lows pass filter 10. In other words, the piezoelectric element 12 is installed such that the vibration force is given at a position deviating in the direction of the optical axis 1 from the center of a direction of the optical axis 1 of the optical low pass filter 10. Thus, the optical low pass filter 10, as shown by an arrow, is given a rotational force around an axis 2 orthogonal to the optical axis 1.

Figure 3:
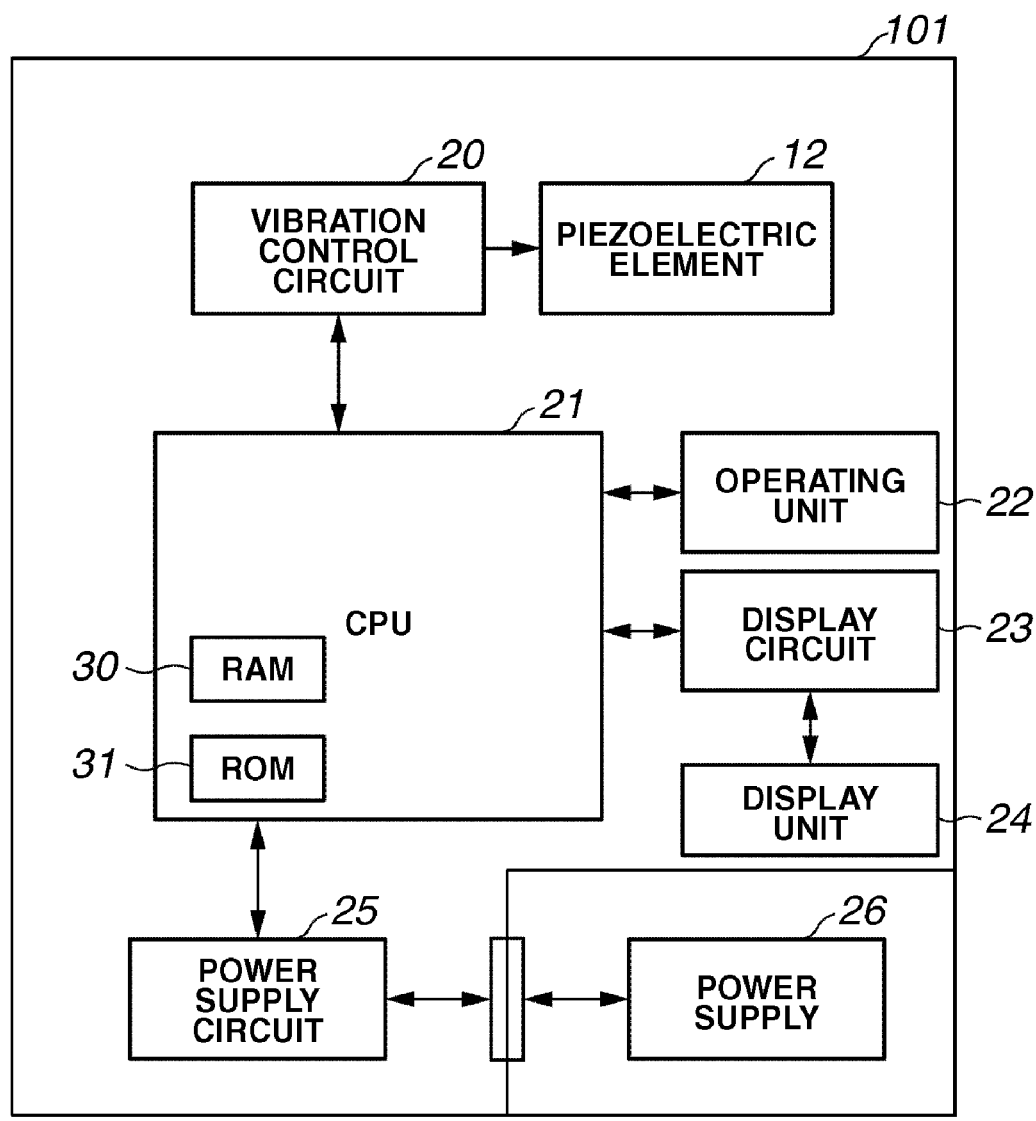
FIG. 3 is a block diagram for describing a functional configuration in a state where the exemplary digital single lens reflex camera is set to a cleaning mode, according to an aspect of the present invention.

FIG. 3 is a block diagram for illustrating an exemplary configuration regarding a cleaning mode for removing the foreign matter of the digital single lens reflex camera according to the first embodiment, in which similar portions identical to the above described drawings are denoted by the same reference numerals.

When the operation unit 22 is operated by the user, a CPU 21 of the camera body 101 receives an instruction to start the cleaning mode and allows the camera 101 to switch to the cleaning mode. It is noted that the operation unit 22 is an operation member for instructing the camera 101 to switch to the cleaning mode, and can include, for example, mechanical buttons, or switches. Alternatively, the operation unit 22 can employ a configuration where the camera 101 is set using a cursor key, or an instruction button in the menu displayed in a display unit 24 which will be described later.

Further, the cleaning mode can be set in such a manner that the mode is automatically started according to the number of imaging times, the date and the like arbitrarily set by the user using the operation unit 22.

The power supply circuit 25 supplies the power necessary for the cleaning mode to each unit of the camera body 101 from a detachable power supply 26 as needed. In addition, the power supply circuit 25 detects a remaining battery capacity of the power supply 26, and transmits a detection result to the CPU 21.

The CPU 21, upon receipt of the instruction signal of the cleaning mode, transmits a driving signal to the optical low pass filter vibration control circuit 20. The CPU 21 includes a RAM 30 for temporarily storing various data necessary in the control processing and a ROM 31 for storing the control programs to be executed.

The display circuit 23 receives a result of the operation by the operation unit 22 and a power supply status from the power supply circuit 25 through the CPU 21, and performs control to display these information on the display unit 24 provided in the camera body 101. The display unit 24 is attached to the back of the camera body 101 so that the user can directly observe a display by the display unit 24.

The optical low pass filter vibration control circuit 20, upon receipt of a driving signal from the CPU 21, generates a periodic voltage for driving the piezoelectric element 12. This periodic voltage is supplied to the piezoelectric element 12 in such a manner that waveform data stored in the RAM 30 is amplified and D/A converted by the vibration control circuit 20. This waveform data can be any of a sine wave, a rectangular wave, a trapezoid wave, and a sawtooth wave. A manner of vibration using any of these waveform data will be described in detail with reference to FIGS. 4A to 4C.

Figure 4A:
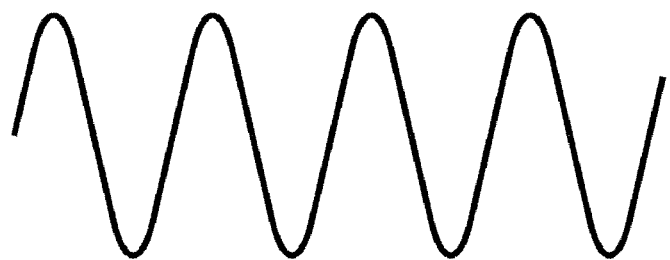
FIGS. 4A to 4C are views for illustrating a voltage applied to a piezoelectric element of the foreign matter removing unit shown in FIG. 3, according to an aspect of the present invention.
Figure 4B:
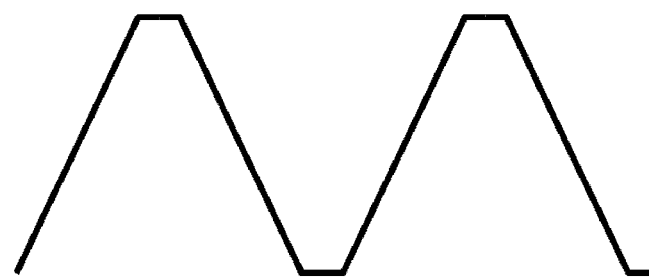
Figure 4C:
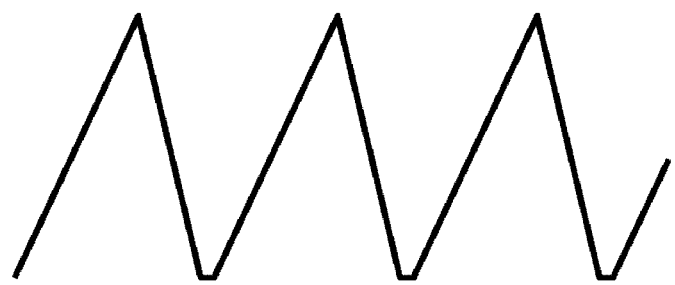

FIGS. 4A to 4C show manners of vibration generated by any of the periodic voltages applied to the piezoelectric element that is polarized in the same direction as the oscillating direction of the vibration (i.e., a thickness direction). FIG. 4A shows a sine wave oscillation, FIG. 4B a trapezoid wave oscillation, and FIG. 4C a sawtooth wave oscillation. When the sine wave oscillation and the trapezoid wave oscillation are utilized, the optical low pass filter vibration control circuit 20 can be easily designed. On the other hand, the sawtooth wave oscillation can remove the foreign matter in one direction which will be described later.

Figure 5A:
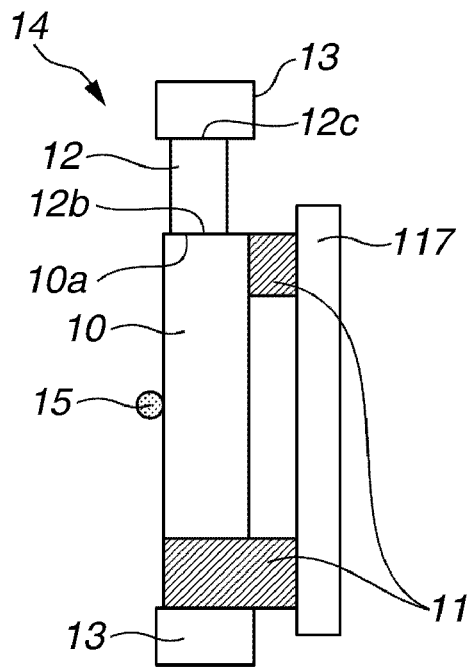
FIGS. 5A to 5C are views for showing behavior of the foreign matter adhering to the surface in sequence of time when an optical low pass filter of the foreign matter removing unit according performs sine wave oscillation, according to an aspect of the present invention.
Figure 5B:
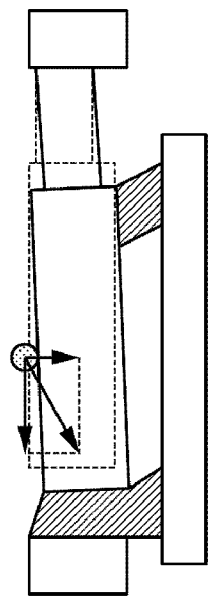
Figure 5C:
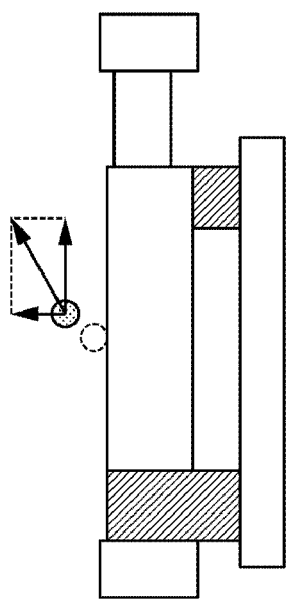

FIGS. 5A to 5C are sectional views of an exemplary foreign matter removing unit 14 and the cover member 117. In FIGS. 5A to 5C, behavior of the foreign matter 15 adhering to the surface of the optical lowpass filter 10 is shown in sequence of time in a case where a voltage is applied to the piezoelectric element 12, and in the optical low pass filter 10 and a sine wave oscillation is generated in a direction orthogonal to the optical axis as shown in FIG. 4.

In FIG. 5A, there is no voltage applied and the foreign matter 15 is adhering to the optical low pass filter 10 before vibration starts. In FIG. 5B, the piezoelectric element 12 is applied with a positive voltage and is extended. A chain line shows a position of the optical low pass filter 10 in FIG. 5A. In FIG. 5B, the optical low pass filter 10 is accelerated in a direction orthogonal to the optical axis.

Further, the central axes in the direction of the optical axis of the piezoelectric element 12 and the optical low pass filter 10, are disposed so as not to correspond with each other, and therefore, by the vibration force of the piezoelectric element 12, the optical lowpass filter 10 is given a rotational force around an axis orthogonal to the optical axis. The resilient member 11 holding the optical low pass filter 10 is bent, and vibration having a component in the direction of the optical axis is also generated in the optical low pass filter 10, and the foreign matter 15 is, as shown in an arrow, applied with a force in the direction synthesizing a direction orthogonal to the optical axis and a direction to the optical axis.

When an inertia force of the foreign matter 15 accelerated by the optical low pass filter 10 exceeds an amount of an adhering force of the foreign matter 15 multiplied by the coefficient of static friction, the foreign matter 15 makes movement. At this time, a contact area, and distance between the foreign matter 15 and the optical low pass filter 10 become smaller and shorter. Hence, a van der Waals' force, a liquid bridging force, and an electrostatic force which mainly constitute the adhering force of the foreign matter 15, are weakened, and the adhering force of the foreign matter 15 is sharply reduced as compared with the adhering force before moving.

As shown in FIG. 5C, when the optical low pass filter 10 returns to a state in FIG. 5A, if a force stronger than the adhering force of the foreign matter 15 moving on the optical low pass filter 10 is given to the foreign matter 15 in the direction of the optical axis, the foreign matter 15 is separated from the optical low pass filter 10 and dropped in a direction of the gravitational force.

Further, in the case where the trapezoid wave oscillation is generated as shown in FIG. 4B, the foreign matter is also separated similar to FIGS. 5A to 5C. However, since acceleration is greater than the sine wave oscillation in this case, it is possible to remove the foreign matter by a smaller amplitude when the frequency of the trapezoid wave is the same as the sine wave.

FIGS. 6A to 6D are sectional views of the foreign matter removing unit 14 and the cover member 117, and show the behavior of the foreign matter 15 adhering on the surface of the optical low pass filter 10 in sequence of times in a case where the piezoelectric element 12 is applied with a voltage and in the optical low pass filter 10, a sawtooth wave as shown in FIG. 4C is generated in the direction orthogonal to the optical axis.

Figure 6A:
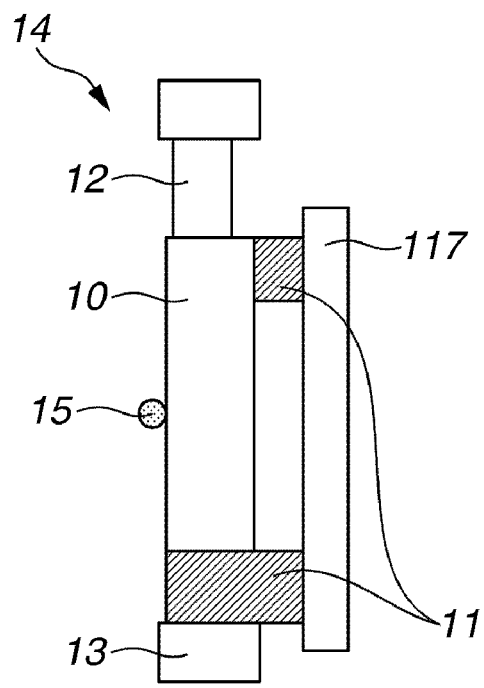
FIGS. 6A to 6D are views for showing behavior of the foreign matter adhering to the surface in sequence of time when the optical low pass filter of the foreign matter removing unit according performs sawtooth oscillation, according to an aspect of the present invention.
Figure 6B:
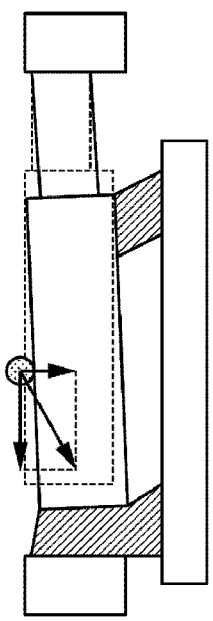

In FIG. 6A, no voltage is applied and the foreign matter 15 is adhering to the optical low pass filter 10 before vibration starts. FIG. 6B shows that the piezoelectric element 12 is extended. The central axes in the direction of the optical axis of the piezoelectric element 12 and the optical low pass filter 10, are disposed so as not to correspond with each other, and therefore, the optical low pass filter 10 receives a rotational force around an axis orthogonal to the optical axis. The rubber member 11 holding the optical low pass filter 10 is bent, and the optical low pass filter 10 has vibrations which are generated also in the direction of the optical axis, and as shown by an arrow, the foreign matter 15 is applied with a force in the direction synthesizing a direction orthogonal to the optical axis and a direction to the optical axis.

Figure 6C:
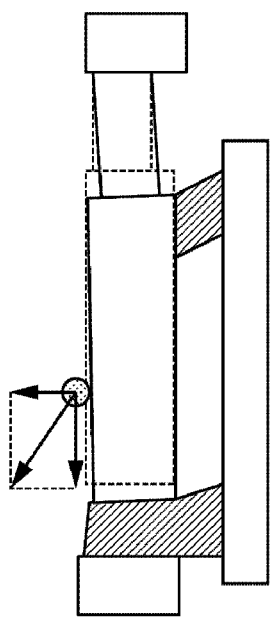
Figure 6D:
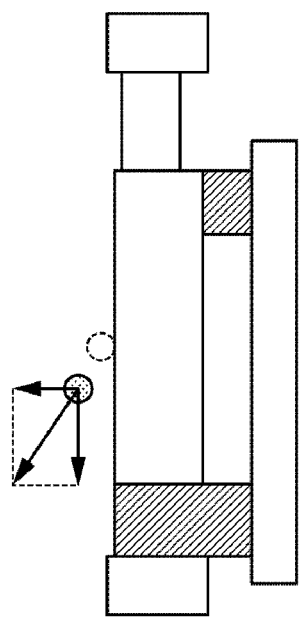

FIG. 6C shows a state in which the piezoelectric element 12 shrinks from the state in FIG. 6B, and an acceleration greater than the acceleration in FIG. 6A to FIG. 6B is generated in the optical low pass filter 10. At this time, when an inertia force of the foreign matter 15 exceeds an amount of an adhering force of the foreign matter 15 multiplied by coefficient of static friction, the foreign matter 15 moves in a direction of the inertia received in FIG. 6B, and as described above, the adhering force of the foreign matter 15 is sharply reduced. Further, the foreign matter 15 is applied with a force also in the direction of the optical axis as shown by an arrow, and when the force exceeds the adhering force of the foreign matter 15 moving on the optical pass filter 10, the foreign matter 15 is separated from the optical low pass filter 10 and dropped in a direction of the gravitational force. In this manner, the sawtooth wave oscillation is generated in the optical low pass filter 10 so that the foreign matter can be removed in one direction.

Figure 7A:
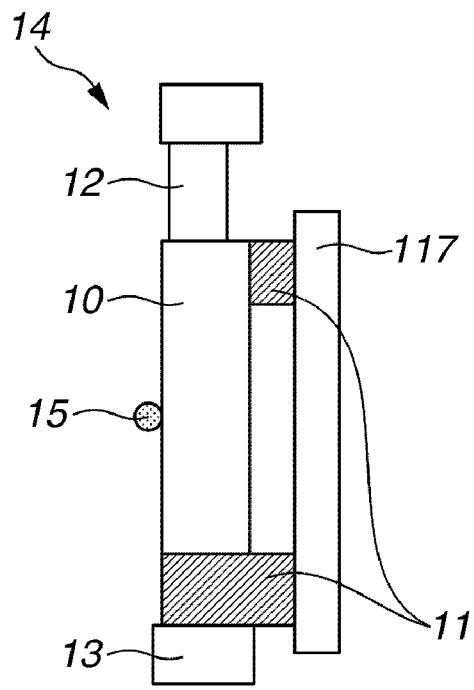
FIGS. 7A to 7C are views for showing behavior of the foreign matter adhering to the surface in sequence of time when the optical low pass filter of the foreign matter removing unit performs resonant oscillation in the direction to an optical axis, according to an aspect of the present invention.
Figure 7B:
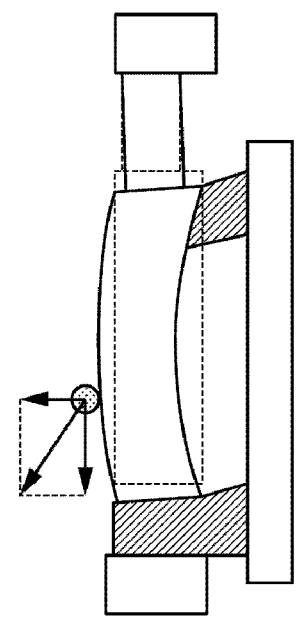
Figure 7C:
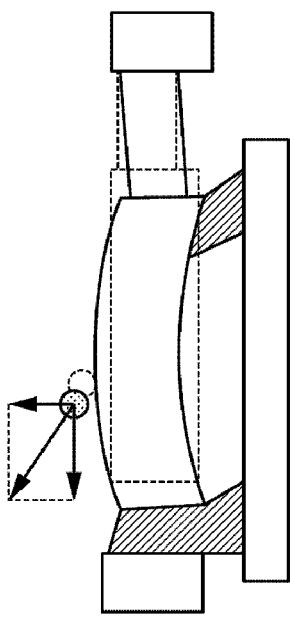

FIGS. 7A to 7C are sectional views of the foreign matter removing unit 14 and the cover member 117, which shows a voltage being applied to the piezoelectric element 12, and the resulting vibrations transmitted to optical low pass filter 10. Further, FIGS. 7A to 7C show the behavior of the foreign matter 15 in sequence of time when the natural frequency at that time and the natural frequency of the optical lowpass filter 10 correspond with each other.

In FIG. 7A, no voltage is applied and the foreign matter 15 is adhering to the optical low pass filter 10 before vibration starts. In FIG. 7B, the piezoelectric element 12 is applied with a positive voltage, and the optical low pass filter 10 starts vibrating. At this time, the optical low pass filter 10 generates vibrations of a natural mode and causes large vibrations also in the direction of the optical axis. As shown in FIG. 7C, when an inertia force of the foreign matter 15 given by the optical low pass filter 10 exceeds an amount of an adhering force of the foreign matter 15 which is multiplied by coefficient of static friction, the foreign matter 15 makes movement, and as described above, the adhering force of the foreign matter 15 is sharply reduced. Further, by the vibrations of the natural mode of the optical low pass filter, the foreign matter 15, as shown by the arrow, is applied with a large force also in the direction of the optical axis. When the force in the direction of the optical axis exceeds the adhering force of the foreign matter 15 moving on the optical pass filter 10, the foreign matter 15 is separated from the optical low pass filter 10 and dropped in a direction of the gravitational force.

In this manner, the optical lowpass filter 10 is given the vibration of the natural mode, so that large amplitude in the direction of the optical axis can be acquired, and the foreign matter can be removed by smaller energy.

Further, the resonance frequency of the piezoelectric element 12 can be acquired from a formula (1) as follows.

$$f = \frac{1}{2\pi}\sqrt{\frac{k}{m}} \text{ (Hz)} \qquad \text{formula (1)}$$

In this formula (1), m stands for a mass (kg) of the optical low pass filter 10, and k stands for a spring constant (N/m) of the piezoelectric element 12. For example, when the mass m of the optical low pass filter 10 is $3\times10^{-3}$ kg and the spring constant K of the piezoelectric element 12 is $100\times10^6$ N/m, the resonance frequency f is 29 kHz. As evident from the formula (1), when the mass of the optical low pass filter 10 is small or the spring constant K is great, the resonance frequency becomes large, and vibrations occur in an ultrasonic range. In the present embodiment, by applying a voltage at the resonance frequency of the piezoelectric element 12, large amplitude can be generated by the minimum possible energy, and the foreign matter can be easily removed.

Second Exemplary Embodiment

Figure 8A:
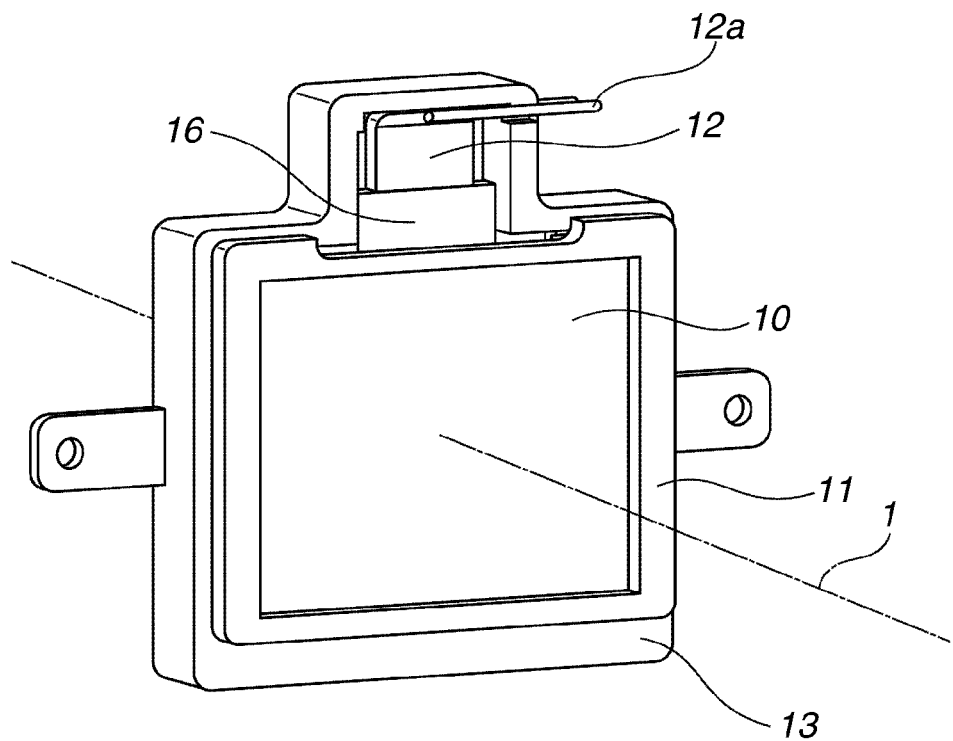
FIGS. 8A to 8B are perspective views and sectional views of the foreign matter removing unit according to another embodiment.
Figure 8B:
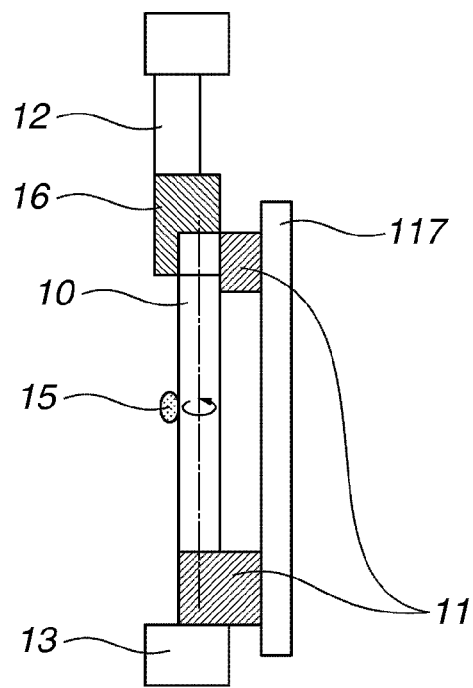
Figure 9:
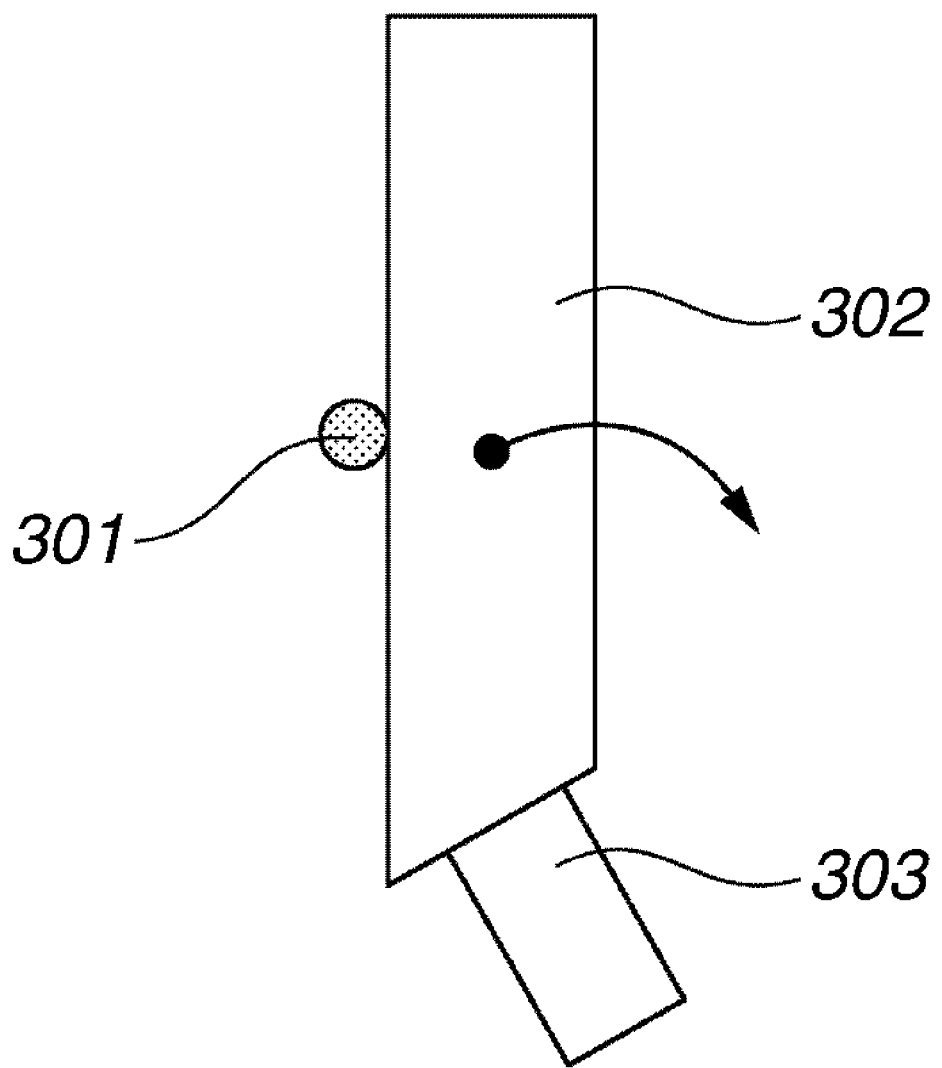
FIG. 9 is a schematic view of a conventional foreign matter removing unit.

FIGS. 8A and 8B show an exemplary foreign matter removing unit 14 according to a second embodiment of the present invention, which provides a holding member 16 for holding an optical low pass filter 10. FIG. 8A is a perspective view, and FIG. 8B is a sectional view including a cover member 117. The rest of the foreign matter removing unit 14 is similar to the first embodiment, and therefore, the same reference numerals are used, and the description thereof will not be repeated.

The holding member 16 is fixed to an end surface in a direction of an optical axis of the optical low pass filter 10. Further, in an end surface opposed to the optical low pass filter 10 of the holding member 16, a piezoelectric element 12 is fixed, which is installed such that the vibration force is biased in the direction of an optical axis 1 with respect to a point immediately below the center of gravity of the optical low pass filter 10. The oscillating direction of the vibration surface of the piezoelectric element 12 is orthogonal to the optical axis 1. Thus, the optical low pass filter 10, as shown by an arrow, is given a rotational force around an axis orthogonal to the optical axis 1. Young's modulus of the holding member 16 is greater than at least the piezoelectric element 12 (for example, $5\times10^{10}$ N/m$^2$) in order to transfer the vibrations of the piezoelectric element 12 to the optical low pass filter 10.

In the second embodiment, when the thickness in the direction of the optical axis of the optical low pass filter 10 is smaller than the length of the vibration surface of the piezoelectric element 12, it is possible to sufficiently transfer the vibrations of the piezoelectric element 12 through the holding member 16. Further, via the holding member 16, the vibration force of the piezoelectric element 12 can be separated in the direction of the optical axis from the center of gravity of the optical low pass filter 10, and a large rotational force around an axis orthogonal to the optical axis 1 of the optical low pass filter 10 can be given.

Further, in the present embodiment, though the piezoelectric element has been used as the vibrating device, the device is not limited to this element, and any device capable of giving vibrations that can remove the foreign matter such as a super magnetostrictive element is feasible. Further, in the present embodiment, the optical low pass filter has been used as the optical element to which the foreign matter adheres. However, the optical element is not limited to this filter, and an infrared cut filter, a cover glass of the imaging sensor, and an independently provided glass plate can also be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-322376 filed Nov. 7, 2005, which is hereby incorporated by reference herein in its entirety.

What is claimed:

1. An imaging apparatus comprising:
   an imaging sensor configured to convert an optical image of a subject into an electrical signal;
   an optical member disposed in front of the imaging sensor in axial alignment with an imaging optical axis of the imaging apparatus;
   a vibrating device configured to apply vibration to a plane of the optical member which is orthogonal to a light incident plane of the optical member, the vibrating device being directly in contact with the plane of the optical member which is orthogonal to the light incident plane of the optical member;
   a control device configured to control the vibration of the vibrating device; and
   an elastic supporting member configured to elastically support at least a plane of the optical member which opposes the plane applied with vibration by the vibrating device,
   wherein the vibrating device applies a force to an alien substance adhering on a surface of the optical member by applying vibration to the plane of the optical member which is orthogonal to the light incident plane of the optical member at a position outside a center of gravity in the optical axis direction of the optical member, the force applied to the alien substance being a combined force of a force in a vibration direction of the vibrating device and a force in the optical axis direction of the optical member.

2. The imaging apparatus according to claim 1, wherein the control device performs control so that the vibrating device generates at least one of a sine wave oscillation, a trapezoid wave oscillation, and a sawtooth wave oscillation.

3. The imaging apparatus according to claim 1, wherein the holding member seals the imaging sensor and the optical member.

4. An imaging apparatus comprising:
   an imaging sensor configured to convert an optical image of a subject into an electrical signal;
   an optical member disposed in front of the imaging sensor in axial alignment with an imaging optical axis of the imaging apparatus;
   a vibrating device configured to apply vibration to a plane of the optical member which is orthogonal to a light incident plane of the optical member;
   a control device configured to control the vibration of the vibrating device;
   an elastic supporting member configured to elastically support at least a plane of the optical member which opposes the plane applied with vibration by the vibrating device; and
   a rigid holding member disposed between the optical member and the vibrating device, the vibrating device applying vibration to the optical member through the rigid holding member;
   wherein the vibrating device applies a force to an alien substance adhering on a surface of the optical member by applying vibration to the plane of the optical member which is orthogonal to the light incident plane of the optical member at a position outside a center of gravity in the optical axis direction of the optical member, the force applied to the alien substance being a combined force of a force in a vibration direction of the vibrating device and a force in the optical axis direction of the optical member.

5. The imaging apparatus according to claim 4, wherein the control device performs control such that the vibrating device generates at least one of a sine wave oscillation, a trapezoid wave oscillation, and a sawtooth wave oscillation.

6. The imaging apparatus according to claim 4, wherein the flexible holding member seals the imaging sensor and the optical member.

* * * * *